United States Patent
Yan et al.

(10) Patent No.: US 12,098,982 B1
(45) Date of Patent: Sep. 24, 2024

(54) BIOCHEMICAL SLUDGE AND PHYSICOCHEMICAL SLUDGE SEPARATE SAMPLING DEVICE FOR IDENTIFYING ATTRIBUTES OF SLUDGE

(71) Applicant: Nanjing Institute of Environmental Sciences, MEE, Nanjing (CN)

(72) Inventors: Xiaofei Yan, Nanjing (CN); Jinglong Liu, Nanjing (CN); Houhu Zhang, Nanjing (CN); Dong Xu, Nanjing (CN); Mengqi Liu, Nanjing (CN); Congcong Sun, Nanjing (CN); Xiang Chen, Nanjing (CN); Zifei Sun, Nanjing (CN); Mengcheng Wu, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/489,008

(22) Filed: Oct. 18, 2023

(51) Int. Cl.
*G01N 1/18* (2006.01)
*G01N 1/10* (2006.01)

(52) U.S. Cl.
CPC ....... *G01N 1/18* (2013.01); *G01N 2001/1025* (2013.01); *G01N 2001/1043* (2013.01)

(58) Field of Classification Search
CPC ............. G01N 1/18; G01N 2001/1025; G01N 2001/1043
USPC .......................................... 73/863.21, 863.31
See application file for complete search history.

(56) References Cited

FOREIGN PATENT DOCUMENTS

| CN | 106219907 A | 12/2016 |
|---|---|---|
| CN | 206051803 U | 3/2017 |
| CN | 106746379 A | 5/2017 |
| CN | 107314912 A | 11/2017 |
| CN | 209619104 U | 11/2019 |
| CN | 210665138 U | 6/2020 |
| CN | 210711167 U | 6/2020 |
| CN | 211004966 U | 7/2020 |
| CN | 211333230 U | 8/2020 |
| CN | 111999459 A | 11/2020 |
| CN | 112229673 A | 1/2021 |

(Continued)

OTHER PUBLICATIONS

Search Report, issued in CN202310727575.2 (priority application), by CNIPA, dated Jun. 20, 2023.

(Continued)

*Primary Examiner* — Daniel S Larkin
*Assistant Examiner* — Nashmiya S Fayyaz
(74) *Attorney, Agent, or Firm* — Zhu Lehnhoff LLP

(57) ABSTRACT

A biochemical sludge and physicochemical sludge separate sampling device for identifying attributes of sludge, includes a sludge extraction assembly, and a biochemical reaction tank and a physicochemical reaction tank which are respectively connected to the sludge extraction assembly through connection pipelines. The sludge extraction assembly includes an outer shell, a porous plate clamped to an inner bottom of the outer shell, and a sampling dish. A drain pipe is arranged at a lower end of the outer shell. The sampling dish is provided with a biochemical sludge cavity and a physicochemical sludge cavity. Filter cloth is arranged at inner bottoms of the biochemical sludge cavity and the physicochemical sludge cavity. Electric extrusion stems are arranged at an inner top of the outer shell; and the electric extrusion stems are provided with extrusion plug plates.

8 Claims, 5 Drawing Sheets

(56) References Cited

FOREIGN PATENT DOCUMENTS

| | | | |
|---|---|---|---|
| CN | 112229680 A | | 1/2021 |
| CN | 212432662 U | | 1/2021 |
| CN | 212780101 U | | 3/2021 |
| CN | 113008630 A | | 6/2021 |
| CN | 214225130 U | | 9/2021 |
| CN | 214408236 U | | 10/2021 |
| CN | 214667908 U | | 11/2021 |
| CN | 214764997 U | | 11/2021 |
| CN | 215262565 U | | 12/2021 |
| CN | 113945694 A | | 1/2022 |
| CN | 217059513 U | | 7/2022 |
| CN | 217359139 U | | 9/2022 |
| CN | 217878446 U | | 11/2022 |
| CN | 218157001 U | | 12/2022 |
| CN | 116161775 A | | 5/2023 |
| CN | 219038470 U | | 5/2023 |
| CN | 116835838 A | * | 10/2023 |
| CN | 220131919 U | * | 12/2023 |
| JP | 2012177639 A | | 9/2012 |
| KR | 102147054 B1 | | 8/2020 |
| KR | 102352765 B1 | | 1/2022 |

OTHER PUBLICATIONS

Examination Report, issued in CN202310727575.2 (priority application), by CNIPA, dated Jul. 24, 2023.
Notice of Grant of Patent Rights, issued in CN202310727575.2 (priority application), by CNIPA, dated Aug. 1, 2023.
Search Report, issued by Zhanqiao Patent Agency, dated Sep. 20, 2023.

* cited by examiner

BIOCHEMICAL SLUDGE AND PHYSICOCHEMICAL SLUDGE SEPARATE SAMPLING DEVICE FOR IDENTIFYING ATTRIBUTES OF SLUDGE

REFERENCE TO RELATED APPLICATIONS

The present application claims the priority of Chinese patent application No. 202310727575.2, filed on 2023 Jun. 20, the entire disclose of which is incorporated herein by reference.

TECHNICAL FIELD

The present disclosure relates to the technical field of sludge treatment, and specifically, to a biochemical sludge and physicochemical sludge separate sampling device for identifying attributes of sludge.

BACKGROUND

At present, sludge generated during sewage treatment is often not listed in the National Hazardous Waste List and has unclear hazardous characteristics. Therefore, it is necessary to identify attributes of hazardous wastes in order to clarify subsequent management methods.

According to the General Principles for Solid Waste Identification Standards (GB34330), sludge generated by water purification and wastewater treatment belongs to substances generated during environmental governance and pollution control. The Technical Specification for Hazardous Waste Identification (HJ 298) states that "solid wastes are substances generated during the environmental governance and pollution control specified in GB 34330, and should be sampled in a production period with a stable pollutant source, a stable facility operating load and a stable effect. Solid wastes generated in different process steps should be sampled separately according to flows of the environmental governance and pollution control.

At present, the common problem in enterprises is that biochemical reaction sludge and physicochemical reaction sludge jointly enter drain pipes and are then merged into a unified sludge thickening tank. After being thickened, the sludge is dehydrated by a pressure filter. The biochemical reaction sludge and the physicochemical reaction sludge are mixed together after being generated, making it impossible to sample solid wastes generated in different process steps according to the standard requirements. To achieve separate sampling of sludge, the subsequent thickening tank needs to be emptied, and stop valves are added in the drain pipes of a biochemical reaction tank and a physicochemical reaction tank. It is ensured that the physicochemical reaction tank does not drain water when the biochemical reaction tank drains water, and vice versa, thus achieving separate sampling of the two kinds of sludge. This method obviously affects the normal production of an enterprise and brings inconvenience to on-site operations.

SUMMARY

For the above technical problem, the present disclosure provides biochemical sludge and physicochemical sludge separate sampling device for identifying attributes of sludge.

Technical solutions of the present disclosure are as follows: A biochemical sludge and physicochemical sludge separate sampling device for identifying attributes of sludge includes a sludge extraction assembly, and a biochemical reaction tank and a physicochemical reaction tank which are respectively connected to the sludge extraction assembly through connection pipelines; the biochemical reaction tank and the physicochemical reaction tank have the same structures;

the sludge extraction assembly includes an outer shell provided with a support at a lower end, a porous plate movably clamped to an inner bottom of the outer shell, and a sampling dish movably clamped in the outer shell and located at an upper end of the porous plate; a drain pipe is arranged on a lower bottom surface of the outer shell; an open door is arranged on a side wall of the outer shell; the sampling dish is provided with a biochemical sludge cavity and a physicochemical sludge cavity; filter cloth is arranged at inner bottoms of both the biochemical sludge cavity and the physicochemical sludge cavity; a first sample injection port communicated with the biochemical sludge cavity and the physicochemical sludge cavity is arranged on a side wall of the sampling dish; a second sampling port is arranged at a position, corresponding to a position of the first sample injection port, on the side wall of the outer shell; electric extrusion stems are arranged at positions, corresponding to positions of the biochemical sludge cavity and the physicochemical sludge cavity, on an inner top of the outer shell; extrusion plug plates are arranged at lower ends of the two electric extrusion stems; a switching motor is arranged on an upper end surface of the outer shell; an output shaft of the switching motor penetrates through the outer shell and is sleeved with a bourdon tube movably clamped with the sampling dish;

there are two connection pipelines; sludge pumps are arranged at junctions between the two connection pipelines and the biochemical reaction tank and the physicochemical reaction tank; movable joints are arranged at junctions between the two connection pipelines and the sludge extraction assembly; the two movable joints can be inserted into the second sample injection port and the first sample injection port at the corresponding positions;

upper end surfaces of both the biochemical reaction tank and the physicochemical reaction tank are clamped with mounting platforms; a screw support is arranged on a lower bottom surface of each mounting table; a lifting motor is arranged on an upper end surface of each mounting table; output shafts of the lifting motors are provided with lifting screws rotatably clamped with the screw supports; the lifting screws are in threaded connection with sampling heads slidably clamped with the screw supports; and the sampling heads are connected to the connection pipelines through retractable hoses.

Further, a plurality of biochemical sludge cavities and a plurality of physicochemical sludge cavities are provided; the plurality of biochemical sludge cavities and the plurality of physicochemical sludge cavities are symmetrically arranged inside the sampling dish; and the first sample injection ports are arranged at positions, corresponding to the positions of the respective biochemical sludge cavities and the positions of the respective physicochemical sludge cavities, on the side wall of the sampling dish.

It is noted that: By the arrangement of the plurality of biochemical sludge cavities and the plurality of physicochemical sludge cavities, the switching motor is used to drive the sampling dish to rotate in the outer shell, which can simultaneously collect a plurality of biochemical sludge samples and a plurality of physicochemical sludge samples, and the sampling efficiency is improved.

Further, first electric push rods connected to the movable joints are arranged on the side wall of the outer shell.

It is noted that: The first electric push rods are used to push the movable joints to be plugged into the corresponding second sample injection ports and the first sample injection ports, so that the connection pipelines are quickly communicated to the biochemical sludge cavities and the plurality of physicochemical sludge cavities.

Further, flowmeters and turbidimeters are arranged at the junctions between the connection pipelines and the biochemical reaction tank and the physicochemical reaction tank; and the outer shell is provided with a programmable logic controller (PLC) electrically connected to the flowmeters and the turbidimeters.

It is noted that: In the biochemical sludge and physicochemical sludge sampling process, the flowmeters and the turbidimeters are used to control a desired amount of extracted sludge, which improves the automatic operation degree of the device.

Further, the sampling heads are internally hollowed; a plurality of first through holes are distributed at one end, away from each lifting screw, of each sampling head in an equal spacing manner; an end portion of each sampling head is slidably clamped with a plurality of start and stop plates; all the start and stop plates are provided with second through holes communicated with the first through holes at the corresponding positions; reset springs are arranged at junctions between the respective start and stop plates and the sampling heads; second electric push rods are arranged inside the sampling heads; and end portions of the second electric push rods are provided with extrusion ball heads abutting against ends, close to each other, of the respective start and stop plates.

It is noted that: When the sampling heads reach a predetermined depth, the second electric push rods push the extrusion ball heads to move towards the respective start and stop plates and make the respective start and stop plates get away from each other. In this case, the second through holes overlap the first through holes, and the sludge enters the sampling heads, which avoids mutual interference between the sludge samples at different depths, thus improving the accuracy of a sludge detection result.

Further, sliding clamping slots are arranged on the upper end surfaces of the mounting platforms; sliding seats and third electric push rods connected to the sliding seats are arranged inside the sliding clamping slots; and the screw supports, the lifting motors, and the sludge pumps are all arranged on the sliding seats.

It is noted that: By the arrangement of the third electric push rods and the sliding seats, it is convenient to adjust horizontal positions of the sampling heads, so that the sludge samples at different positions at the same depths in the biochemical reaction tank and the physicochemical reaction tank.

Further, a rotating motor is arranged at one end, close to the biochemical reaction tank, on the upper end surface of each mounting platform; an output shaft of the rotating motor is provided with a rotating gear located at an edge of the mounting platform; and the rotating gear is engaged with the biochemical reaction tank.

It is noted that: The rotating motor is used to drive the rotating gear to rotate, so that the mounting platforms rotate on the biochemical reaction tank and the physicochemical reaction tank, and it is convenient to collect the sludge samples at the respective positions inside the biochemical reaction tank and the physicochemical reaction tank.

Further, elastic supporting plates are arranged at inner bottoms of the respective biochemical sludge cavities and inner bottoms of the respective physicochemical sludge cavities.

It is noted that: By the arrangement of the elastic supporting plates, it is convenient to transfer the dewatered sludge samples inside the biochemical sludge cavities and the physicochemical sludge cavities, so as to avoid the sludge from being adhered inside the biochemical sludge cavities and the physicochemical sludge cavities.

Further, the lower end of the outer shell is of a conical structure.

It is noted that: The outer shell of the conical structure is favorable for quickly discharging water in the sludge.

A use method of the present disclosure includes the following steps:

S1, respectively connecting the sludge pumps and the electric extrusion stems to an external power supply;

S2, pumping muddy water inside the biochemical reaction tank and the physicochemical reaction tank into the biochemical sludge cavities and the physicochemical sludge cavities through the connection pipelines using the sludge pumps;

S3, turning on the two electric extrusion stems, and driving, by using the electric extrusion stems, the extrusion plug plates to move inside the biochemical sludge cavities and the physicochemical sludge cavities to remove water from biochemical sludge and physicochemical sludge, wherein the removed water is discharged from the outer shell via the drain pipe through the filter cloth and the porous plates in sequence; and S4, driving the extrusion plug plates to be reset by using the electric extrusion stems, opening the open door, taking out the sampling dish from the inside of the outer shell, and transferring the dewatered sludge samples inside the biochemical sludge cavities and the physicochemical sludge cavities.

Compared with the prior art, the present disclosure has the following several beneficial effects:

First, the biochemical sludge and physicochemical sludge separate sampling device for identifying the attributes of the sludge has a reasonable structural design. The following problem is solved: separate sampling cannot be achieved due to the fact that the biochemical reaction tank and the physicochemical reaction tank share one set of drain pipe and due to sludge thickening and dewatering. The efficiency of sampling and detecting the biochemical sludge and the physicochemical sludge is improved, and the device will not generate a side effect on a water treatment system in an operating process and has high reliability and stability.

Second, in the present disclosure, the lifting motors are used to drive the sampling heads to move up and down inside the biochemical reaction tank and the physicochemical reaction tank; the third electric push rods are used to adjust the horizontal positions of the sampling heads; and the rotating motors are used to drive the sampling heads to rotate, so that an effect that the sampling heads sample sludge at any position inside the biochemical reaction tank and the physicochemical reaction tank is achieved, and the sampling efficiency is improved.

Third, in the present disclosure, the start and stop plates capable of being freely opened are arranged at the end portions of the sampling heads, so that mutual interference between sludge at different depths and different positions in

1: sludge extraction assembly; 10: outer shell; 100: support; 101: drain pipe; 102: open door; 103: second sample injection port; 11: porous plate; 12: sampling dish; 120: biochemical sludge cavity; 121: physicochemical sludge cavity; 122: filter cloth; 123: first sample injection port; 13: electric extrusion stem; 130: extrusion plug plate; 14: switching motor; 140: bourdon tube; 15: elastic supporting plate; 2: connection pipeline; 20: sludge pump; 21: movable joint; 22: first electric push rod; 3: biochemical reaction tank; 4: physicochemical reaction tank; 5: mounting platform; 50: screw support; 51: lifting motor; 52: lifting screw; 53: sampling head; 530: first through hole; 531: start and stop plate; 5310: reset spring; 532: second through hole; 533: second electric push rod; 5330: extrusion ball head; 534: retractable hose; 54: sliding clamping slot; 55: sliding seat; 56: third electric push rod; 57: rotating motor; and 570: rotating gear.

DETAILED DESCRIPTION OF THE EMBODIMENTS

Figure 1:
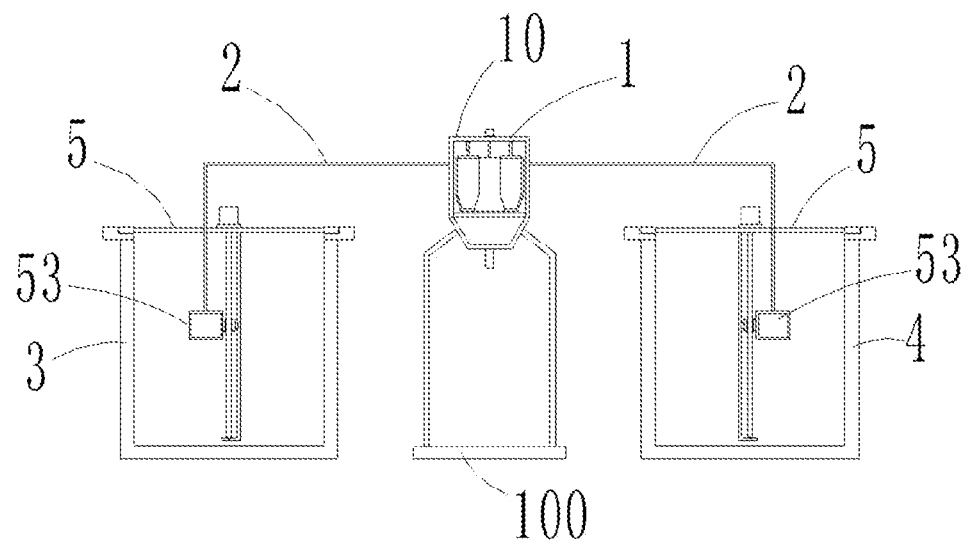
FIG. 1 is a longitudinally sectional view of the present disclosure.

Embodiment 1: A biochemical sludge and physicochemical sludge separate sampling device for identifying attributes of sludge as shown in FIG. 1 includes a sludge extraction assembly 1, and a biochemical reaction tank 3 and a physicochemical reaction tank 4 which are respectively connected to the sludge extraction assembly 1 through connection pipelines 2. The biochemical reaction tank 3 and the physicochemical reaction tank 4 have the same structures.

Figure 2:
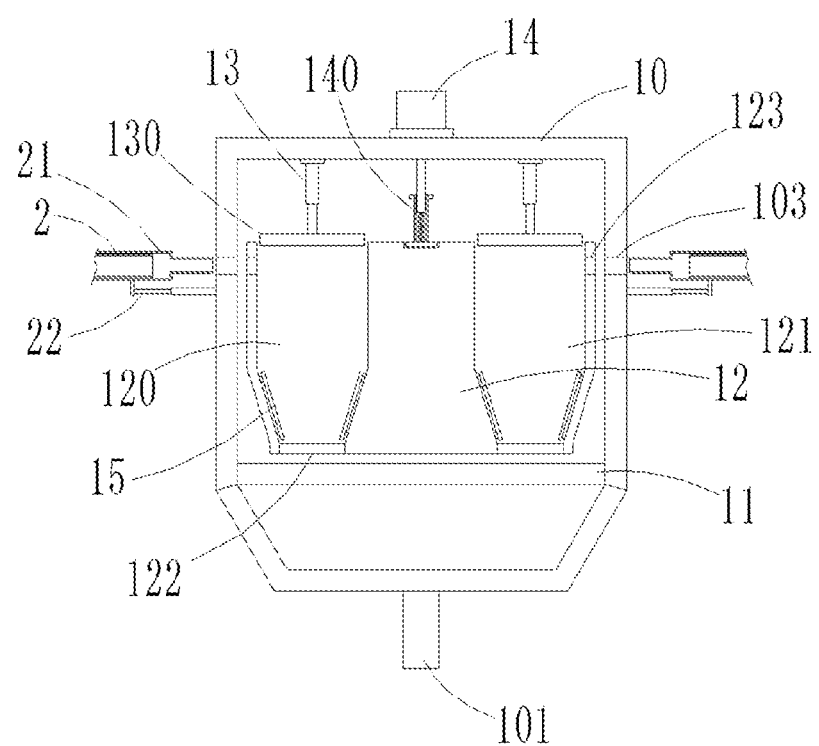
FIG. 2 is a schematic diagram of connection between an outer shell and connection pipelines of the present disclosure.

As shown in FIG. 1 and FIG. 2, the sludge extraction assembly 1 includes an outer shell 10 provided with a support 100 at a lower end, a porous plate 11 movably clamped to an inner bottom of the outer shell 10, and a sampling dish 12 movably clamped in the outer shell 10 and located at an upper end of the porous plate 11; a drain pipe 101 is arranged on a lower bottom surface of the outer shell 10; an open door 102 is arranged on a side wall of the outer shell 10; the sampling dish 12 is provided with one biochemical sludge cavity 120 and one physicochemical sludge cavity 121; filter cloth 122 is arranged at inner bottoms of both the biochemical sludge cavity 120 and the physicochemical sludge cavity 121; a first sample injection port 123 communicated with the biochemical sludge cavity 120 and the physicochemical sludge cavity 121 is arranged on a side wall of the sampling dish 12; a second sampling port 103 is arranged at a position, corresponding to a position of the first sample injection port 123, on the side wall of the outer shell 10; electric extrusion stems 13 are arranged at positions, corresponding to positions of the biochemical sludge cavity 120 and the physicochemical sludge cavity 121, on an inner top of the outer shell 10; extrusion plug plates 130 are arranged at lower ends of the two electric extrusion stems 13; a switching motor 14 is arranged on an upper end surface of the outer shell 10; and an output shaft of the switching motor 14 penetrates through the outer shell 10 and is sleeved with a bourdon tube 140 movably clamped with the sampling dish 12.

Figure 4:
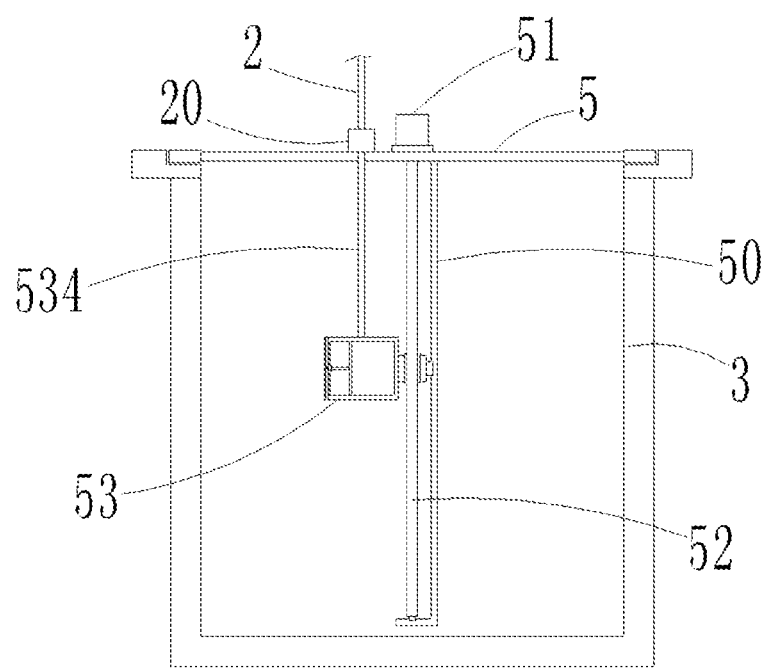
FIG. 4 is a schematic structural diagram of a biochemical reaction tank of the present disclosure.

As shown in FIG. 1, FIG. 2, and FIG. 4, sludge pumps 20 are arranged at junctions between the two connection pipelines 2 and the biochemical reaction tank 3 and the physicochemical reaction tank 4; movable joints 21 are arranged at junctions between the two connection pipelines 2 and the sludge extraction assembly 1; the two movable joints 21 can be inserted into the second sample injection port 103 and the first sample injection port 123 at the corresponding positions; upper end surfaces of both the biochemical reaction tank 3 and the physicochemical reaction tank 4 are clamped with mounting platforms 5; a screw support 50 is arranged on a lower bottom surface of each mounting table 5; a lifting motor 51 is arranged on an upper end surface of each mounting table 5; output shafts of the lifting motors 51 are provided with lifting screws 52 rotatably clamped with the screw supports 50; the lifting screws 52 are in threaded connection with sampling heads 53 slidably clamped with the screw supports 50; and the sampling heads 53 are connected to the connection pipelines 2 through retractable hoses 534.

Figure 3:
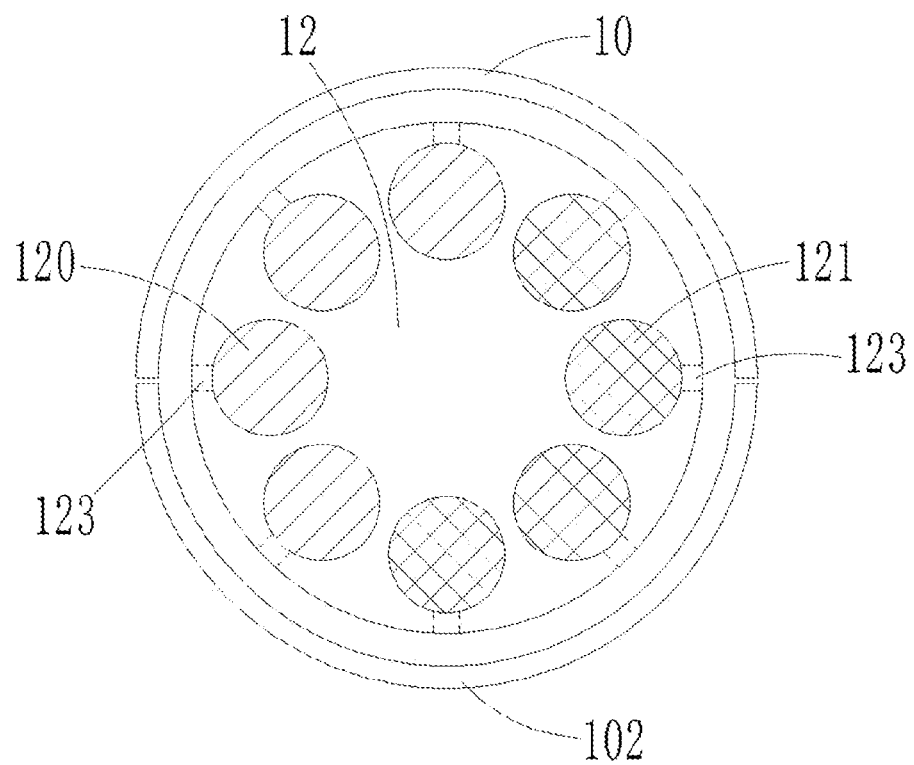
FIG. 3 is a diagram of distribution of biochemical sludge cavities and physicochemical sludge cavities in a sampling dish in Embodiment 2 of the present disclosure.

Embodiment 2: A difference between this embodiment and Embodiment 1 is as follows:

As shown in FIG. 2 and FIG. 3, four biochemical sludge cavities 120 and four physicochemical sludge cavities 121 are provided; the four biochemical sludge cavities 120 and the four physicochemical sludge cavities 121 are symmetrically arranged inside the sampling dish 12; and the first sample injection ports 123 are arranged at positions, corresponding to the positions of the respective biochemical sludge cavities 120 and the positions of the respective physicochemical sludge cavities 121, on the side wall of the sampling dish 12. Elastic supporting plates 15 are arranged at inner bottoms of the respective biochemical sludge cavities 120 and inner bottoms of the respective physicochemical sludge cavities 121.

Figure 9:
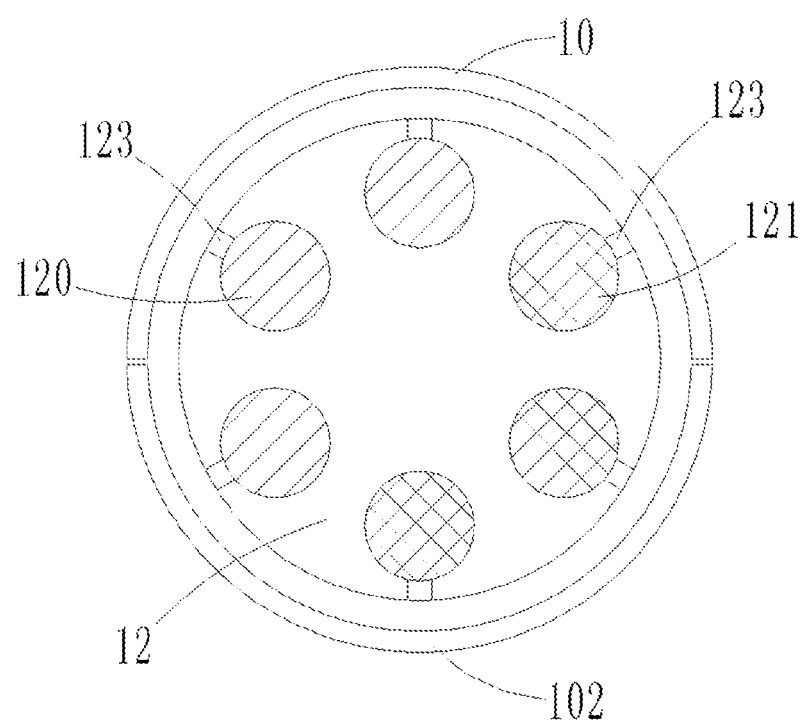
FIG. 9 is a diagram of distribution of biochemical sludge cavities and physicochemical sludge cavities in a sampling dish in Embodiment 3 of the present disclosure.

Embodiment 3: A difference between this embodiment and Embodiment 2 is as follows:

As shown in FIG. 9, three biochemical sludge cavities 120 and three physicochemical sludge cavities 121 are provided, and the three biochemical sludge cavities 120 and the three physicochemical sludge cavities 121 are symmetrically arranged inside the sampling dish 12.

Embodiment 4: A difference between this embodiment and Embodiment 3 is as follows:

As shown in FIG. 2, first electric push rods 22 connected to the movable joints 21 are arranged on the side wall of the outer shell 10; flowmeters and turbidimeters are arranged at the junctions between the connection pipelines 2 and the biochemical reaction tank 3 and the physicochemical reaction tank 4; and the outer shell 10 is provided with a PLC electrically connected to the flowmeters and the turbidimeters.

Figure 6:
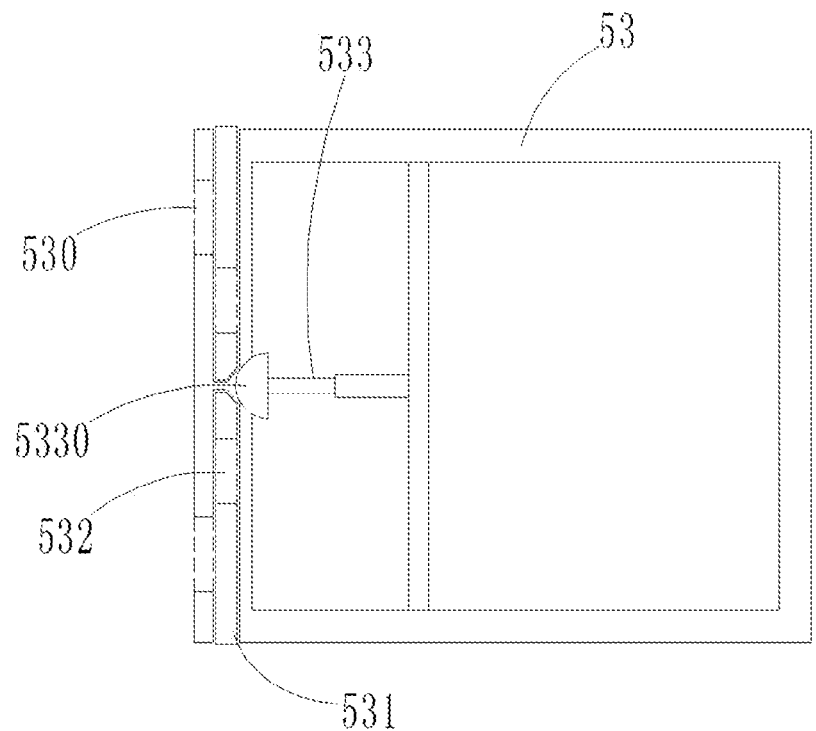
FIG. 6 is a schematic structural diagram of a sampling head of the present disclosure.
Figure 7:
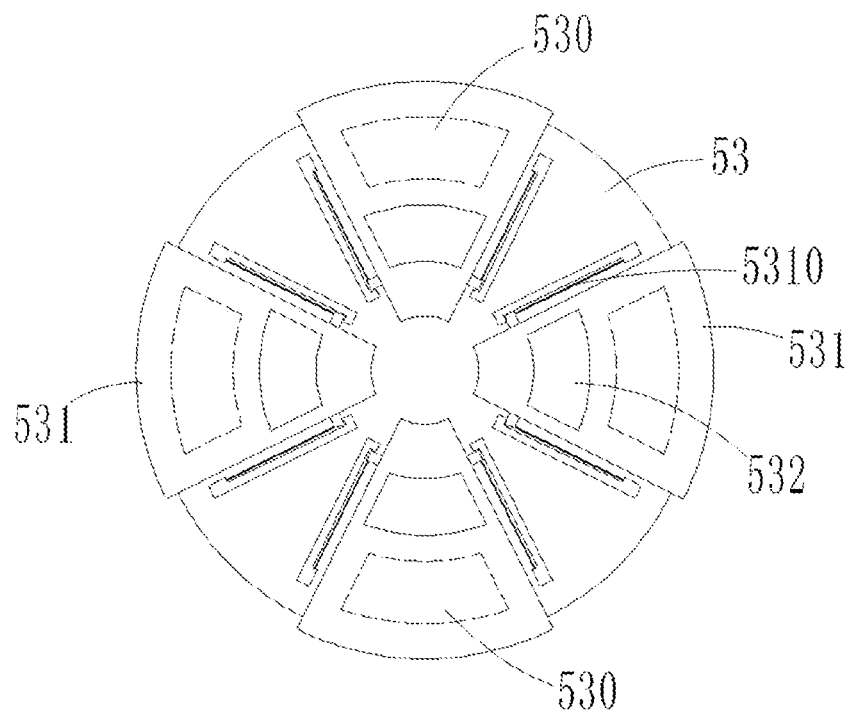
FIG. 7 is a schematic diagram of connection between start and stop plates and a sampling head of the present disclosure.

Embodiment 5: A difference between this embodiment and Embodiment 4 is as follows:

As shown in FIG. 4, FIG. 6, and FIG. 7, the sampling heads 53 are internally hollowed; four first through holes 530 are distributed at one end, away from each lifting screw 52, of each sampling head 53 in an equal spacing manner; an end portion of each sampling head 53 is slidably clamped with four start and stop plates 531; all the start and stop plates 531 are provided with second through holes 532 communicated with the first through holes 530 at the corresponding positions; reset springs 5310 are arranged at junctions between the respective start and stop plates 531 and the sampling heads 53; second electric push rods 533 are arranged inside the sampling heads 53; and end portions of the second electric push rods 533 are provided with extrusion ball heads 5330 abutting against ends, close to each other, of the respective start and stop plates 531.

Figure 5:
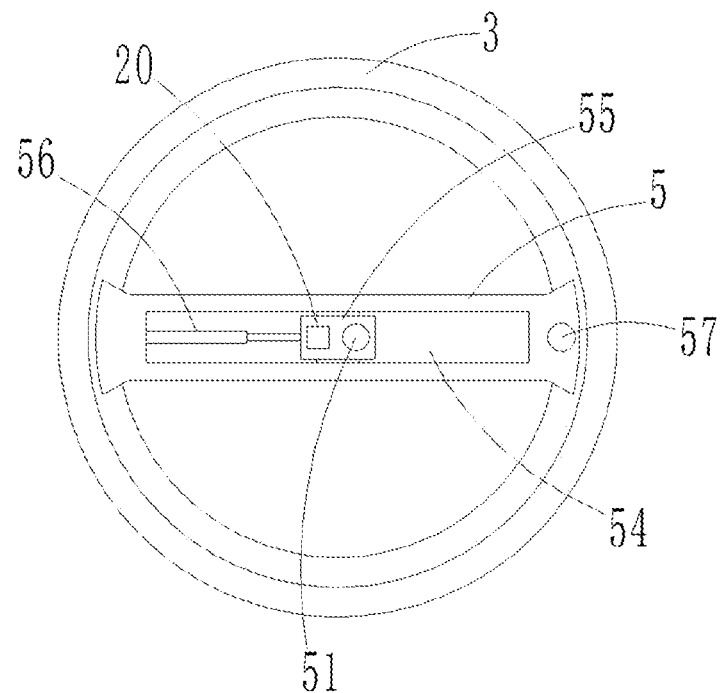
FIG. 5 is a schematic diagram of connection between a mounting platform and a biochemical reaction tank of the present disclosure.
Figure 8:
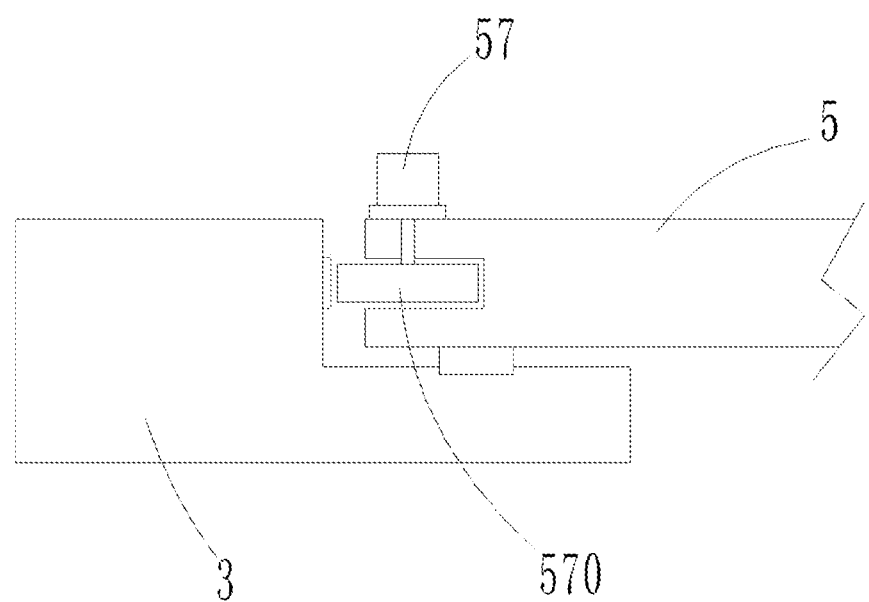
FIG. 8 is a schematic diagram of connection between a rotating motor and a biochemical reaction tank of the present disclosure.

Embodiment 6: A difference between this embodiment and Embodiment 5 is as follows:

As shown in FIG. 5 and FIG. 8, sliding clamping slots 54 are arranged on the upper end surfaces of the mounting platforms 5; sliding seats 55 and third electric push rods 56 connected to the sliding seats 55 are arranged inside the sliding clamping slots 54; the screw supports 50, the lifting motors 51, and the sludge pumps 20 are all arranged on the sliding seats 55; a rotating motor 57 is arranged at one end, close to the biochemical reaction tank 3, on the upper end surface of each mounting platform 5; an output shaft of the rotating motor 57 is provided with a rotating gear 570 located at an edge of the mounting platform 5; and the rotating gear 570 is engaged with the biochemical reaction tank 3.

It should be noted that the PLC, the electric extrusion stems 13, the switching motor 14, the sludge pumps 20, the first electric push rods 22, the flowmeters, the turbidimeters, the lifting motors 51, the second electric push rods 533, the third electric push rods 56, and the rotating motors 57 used in the present disclosure are all the prior art, and will not be specially limited. Corresponding products can be selected according to an actual need.

The invention claimed is:

1. A biochemical sludge and physicochemical sludge separate sampling device for identifying attributes of sludge, comprising a sludge extraction assembly (1), a biochemical reaction tank (3), a physicochemical reaction tank (4), a first connection pipeline (2) and a second connection pipeline (2), wherein the first connection pipeline (2) connecting the biochemical reaction tank (3) to the sludge extraction assembly (1), wherein the second connection pipeline (2) connecting the physicochemical reaction tank (3) to the sludge extraction assembly (1), and wherein the biochemical reaction tank (3) and the physicochemical reaction tank (4) have the same structure;

wherein the sludge extraction assembly (1) comprises an outer shell (10) provided with a support (100) at a lower end, a porous plate (11) movably clamped to an inner bottom of the outer shell (10), and a sampling dish (12) movably clamped in the outer shell (10) and located at an upper end of the porous plate (11); a drain pipe (101) is arranged on a lower bottom surface of the outer shell (10); an open door (102) is arranged on a side wall of the outer shell (10); the sampling dish (12) is provided with at least one biochemical sludge cavity (120) and at least one physicochemical sludge cavity (121); filter cloth (122) is arranged at an inner bottom of each of the at least one biochemical sludge cavity (120) and the at least one physicochemical sludge cavity (121); a first sample injection port (123) in communication with the at least one biochemical sludge cavity (120) is arranged on a side wall of the sampling dish (12); a second sample injection port (103) is arranged at a position, corresponding to a position of the first sample injection port (123), on the side wall of the outer shell (10), and a third sample injection port (123) in communication with the physicochemical sludge cavity (121) is arranged on the side wall of the sampling dish (12); a fourth sample injection port (103) is arranged at a position, corresponding to a position of the third sample injection port (123), on the side wall of the outer shell (10); first and second electric extrusion stems (13) are arranged at positions, corresponding to positions of the at least one biochemical sludge cavity (120) and the at least one physicochemical sludge cavity (121) respectively, on an inner top of the outer shell (10); first and second extrusion plug plates (130) are arranged at lower ends of the first and second electric extrusion stems (13) respectively; a switching motor (14) is arranged on an upper end surface of the outer shell (10); an output shaft of the switching motor (14) penetrates through the outer shell (10) and is sleeved with a bourdon tube (140) movably clamped with the sampling dish (12);

wherein a first sludge pump (20) is arranged at an junction between the first connection pipeline (2) and the biochemical reaction tank (3), and a second sludge pump (20) is arranged an junction between the second connection pipeline (2) and the physicochemical reaction tank (4); wherein a first movable joint (21) is arranged at an junction between the first connection pipeline (2) and the sludge extraction assembly (1), and a second movable joint (21) is arranged at an junction between the second connection pipeline (2) and the sludge extraction assembly (1); the first movable joint (21) is inserted into the second sample injection port (103) and the first sample injection port (123), and the second movable joint (21) is inserted into the fourth sample injection port (103) and the third sample injection port (123);

an upper end surface of each of the biochemical reaction tank (3) and the physicochemical reaction tank (4) is clamped with a mounting platform (5); a screw support (50) is arranged on a lower bottom surface of each mounting platform (5); a lifting motor (51) is arranged on an upper end surface of each mounting platform (5); an output shaft of each lifting motor (51) is provided with a lifting screw (52) rotatably clamped with the screw support (50) of the corresponding lifting motor (51); each lifting screw (52) is in threaded connection with a sampling head (53) slidably clamped with the corresponding screw support (50); and each sampling head (53) is connected to the corresponding connection pipeline (2) through a retractable hose (534).

2. The biochemical sludge and physicochemical sludge separate sampling device for identifying the attributes of the sludge according to claim 1, wherein the at least one biochemical sludge cavity includes a plurality of biochemical sludge cavities (120) and the at least one physicochemical sludge cavity includes a plurality of physicochemical sludge cavities (121); the plurality of biochemical sludge cavities (120) and the plurality of physicochemical sludge cavities (121) are symmetrically arranged inside the sampling dish (12); and there is a first sample injection (123) corresponding to each of the biochemical sludge cavities (120).

3. The biochemical sludge and physicochemical sludge separate sampling device for identifying the attributes of the sludge according to claim 2, wherein elastic supporting plates (15) are arranged at inner bottoms of the respective biochemical sludge cavities (120) and inner bottoms of the respective physicochemical sludge cavities (121).

4. The biochemical sludge and physicochemical sludge separate sampling device for identifying the attributes of the sludge according to claim 1, wherein a first electric push rod (22) connected to each of the movable joints (21) is arranged on the side wall of the outer shell (10).

5. The biochemical sludge and physicochemical sludge separate sampling device for identifying the attributes of the sludge according to claim 1, wherein a flowmeter and a turbidimeter are arranged at the junction between each connection pipeline (2) and the biochemical reaction tank (3) or the physicochemical reaction tank (4); and the outer shell (10) is provided with a programmable logic controller (PLC) electrically connected to the flowmeters and the turbidimeters.

6. The biochemical sludge and physicochemical sludge separate sampling device for identifying the attributes of the sludge according to claim 1, wherein the sampling heads (53) are internally hollowed; a plurality of first through holes (530) are distributed at one end, away from each lifting screw (52), of each sampling head (53) in an equal spacing manner; an end portion of each sampling head (53) is slidably clamped with a plurality of start and stop plates (531); all the start and stop plates (531) are provided with second through holes (532) communicated with the first through holes (530) at the corresponding positions; reset springs (5310) are arranged at junctions between the respective start and stop plates (531) and the sampling heads (53), respectively; second electric push rods (533) are arranged inside the sampling heads (53), respectively; and end portions of the second electric push rods (533) are provided with an extrusion ball heads (5330), respectively, the extrusion ball heads abutting against ends, close to each other, of the respective start and stop plates (531).

7. The biochemical sludge and physicochemical sludge separate sampling device for identifying the attributes of the sludge according to claim 6, wherein a rotating motor (57) is arranged at one end, close to the biochemical reaction tank (3), on the upper end surface of the mounting platform (5) of the biochemical reaction tank (3); an output shaft of the rotating motor (57) is provided with a rotating gear (570) located at an edge of the mounting platform (5) of the biochemical reaction tank (3); and the rotating gear (570) is engaged with the biochemical reaction tank (3).

8. The biochemical sludge and physicochemical sludge separate sampling device for identifying the attributes of the sludge according to claim 1, wherein sliding clamping slots (54) are arranged on the upper end surfaces of the mounting platforms (5), respectively; sliding seats (55) and third electric push rods (56) connected to the sliding seats (55) are arranged inside the sliding clamping slots (54), respectively; and the screw supports (50), the lifting motors (51), and the sludge pumps (20) are all arranged on the sliding seats (55), respectively.

\* \* \* \* \*